United States Patent [19]
Calim

[11] 3,839,881

[45] Oct. 8, 1974

[54] MACHINE FOR PRODUCING FROZEN CONFECTIONS

[76] Inventor: Thomas F. Calim, P.O. Box 158, Jackson Center, Ohio 45334

[22] Filed: May 2, 1973

[21] Appl. No.: 356,399

[52] U.S. Cl.................... 62/340, 62/518, 251/304, 165/159
[51] Int. Cl. ............................................. F25c 7/10
[58] Field of Search ...... 62/340, 342, 518; 251/304; 165/159

[56] References Cited
UNITED STATES PATENTS

| | | | |
|---|---|---|---|
| 1,965,616 | 7/1934 | Vogt | 62/342 X |
| 2,696,219 | 12/1954 | Barksdale | 251/304 X |
| 3,351,131 | 11/1967 | Berthold | 165/159 |
| 3,656,316 | 4/1972 | Stock | 62/70 |

Primary Examiner—William E. Wayner
Attorney, Agent, or Firm—Palmer Fultz, Esq.

[57] ABSTRACT

A machine for producing frozen confections such as milkshakes and ice creams, or the like, wherein liquid mix is delivered from a storage tank through a freezing chamber to a draw-off valve, from which the forzen mix is dispensed into cones or cups. The machine is characterized by heat exchanger means comprising an outer housing forming a passage for flowing refrigerant and a plurality of mix conveying tubes extending longitudinally through said chamber whereby the mix is rapidly and efficiently cooled as it passes from the mix container to the draw-off valve.

7 Claims, 8 Drawing Figures

FIG. 1.
FIG. 2.
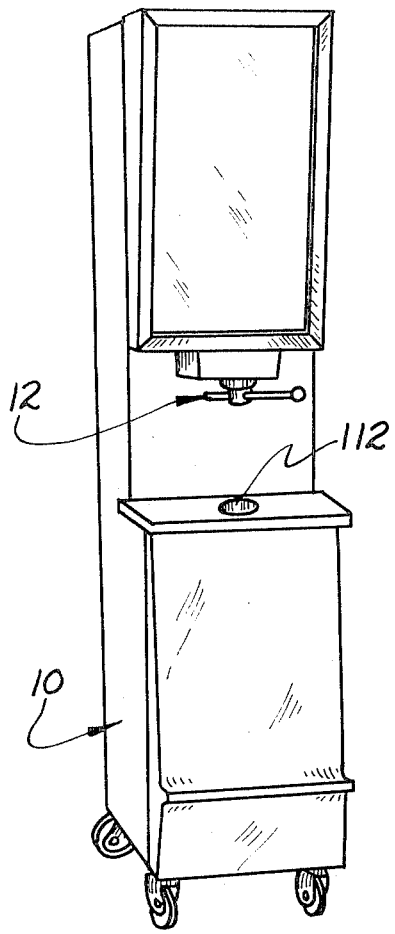
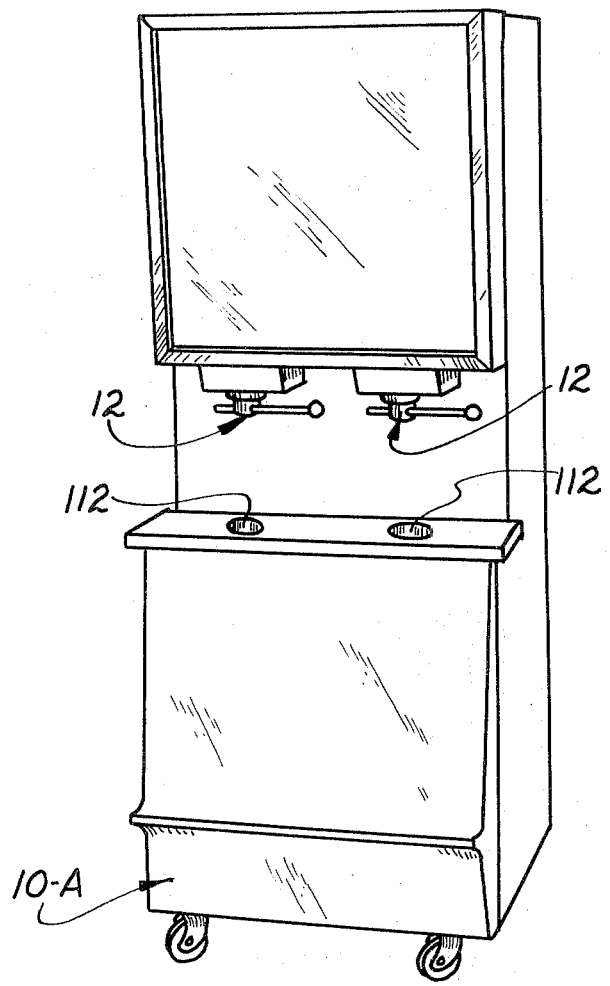

MACHINE FOR PRODUCING FROZEN CONFECTIONS

BACKGROUND OF THE INVENTION

This invention relates generally to machines for producing frozen confections such as soft ice cream, milkshakes, or the like.

In general, the machine of the present invention is of the type used by soft ice cream vendors and sandwich shoppes for filling cones or cups with soft ice cream, the portions of ice cream being released from the dispensing valve of the machine immediately prior to serving the customer.

Machines of this general type comprise an upright frame, the lower portion of which includes a storage cabinet for one or more pressurized mix tanks which are filled with a liquid mixture supplied by the dairy. Machines of this type further include a freezing chamber to which the mix is delivered from the previously mentioned storage tank and wherein the mix is further chilled to stiffen its consistency to a soft ice cream state.

The soft ice cream is released from the freezing chamber by means of a draw-off or dispensing valve which is operated by the vendor to dispense servings of frozen mix to the cone or cup in controlled amounts.

With machines of this type a problem has been present in the art in that the above mentioned freezing chambers have required internal agitating or mixing apparatus for stirring the mix as it progresses through the freezing chamber, such mixing apparatus inherently requires complex and expensive driving means in the form of gear reducers and electric motors together with control circuitry for operating same.

SUMMARY OF THE INVENTION

In accordance with the present invention the ice cream machine is provided with a novel heat exchanger means which eliminates the need for a power driven mixing apparatus in the above mentioned freezing chamber. Such heat exchanger comprises an outer housing forming a longitudinal passage for a colder refrigerant and a plurality of mix conveying tubes extending longitudinally within said housing from an inlet communicating with the mix tank to an outlet communicating with the dispensing valve. The mix conveying tubes are of relatively small diameter and include inner surfaces in direct contact with the flowing mix and outer surfaces in direct contact with the circulating refrigerant fluid. As a result the mix is efficiently and rapidly cooled as it progresses from the mix container to the dispensing valve.

It will now be understood that the novel heat exchanger means of the present invention not only eliminates the need for mixing paddles and driving means therefor but also more efficiently chills the flowing mix.

Further objects and advantages of the present invention will be apparent from the following description, reference being had to the accompanying drawings wherein a preferred form of embodiment of the invention is clearly shown.

BRIEF DESCRIPTION OF THE DRAWINGS

FIG. 1 is a perspective view of a single unit ice cream machine constructed in accordance with the present invention;

FIG. 2 is a perspective view of a multiple unit ice cream machine constructed in accordance with the present invention;

FIG. 6-A is a top showing of an internal baffle.

DESCRIPTION OF THE PREFERRED EMBODIMENT

Referring in detail to the drawings, FIG. 1 illustrates a single station machine for dispensing ice cream or the like whereas FIG. 2 illustrates a dual machine for dispensing ice cream portions simultaneously from two stations.

Figure 3:
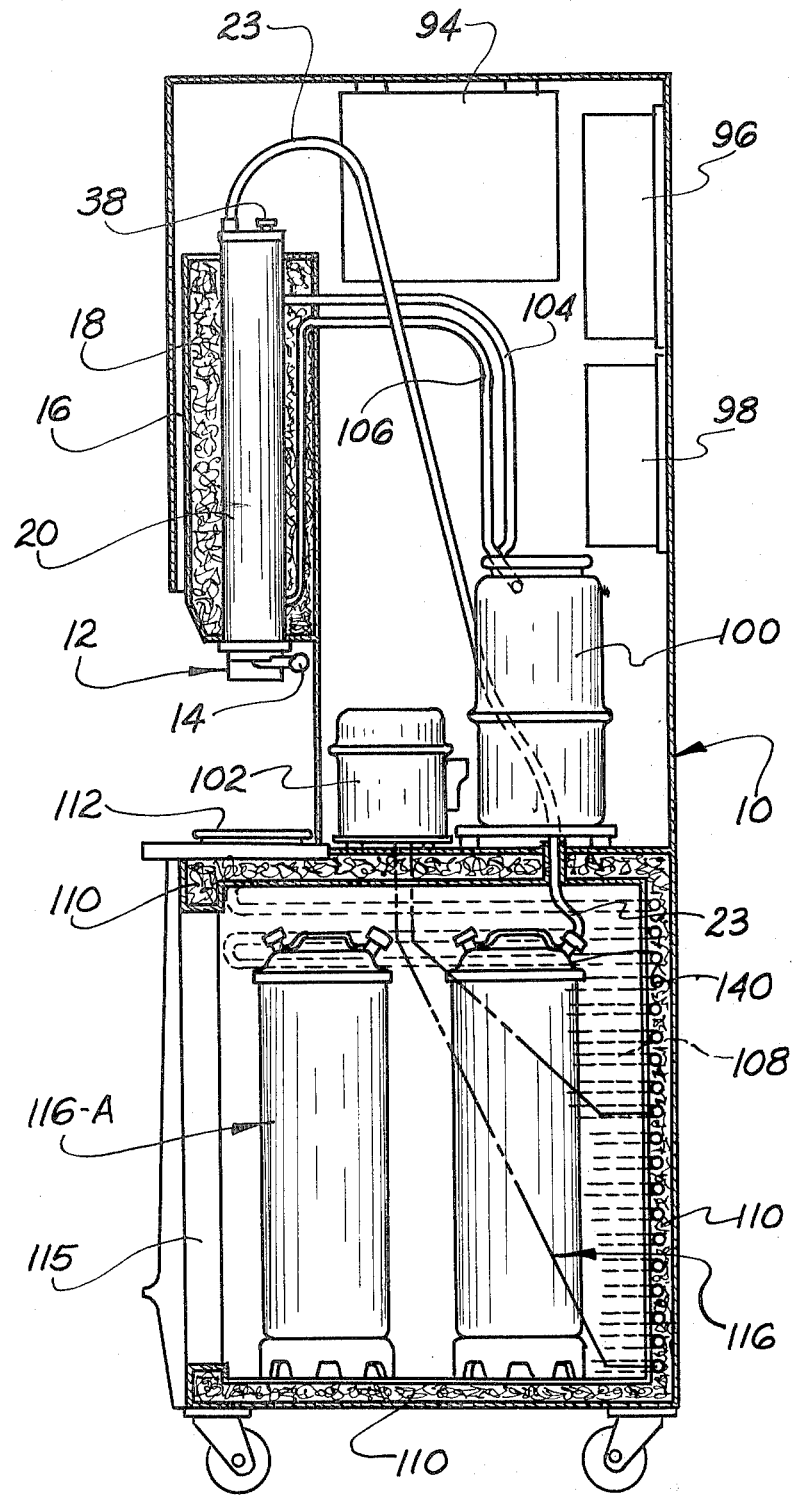
FIG. 3 is a partial side sectional view of a typical unit of one of the machines of the preceding figures, the section being taken along a vertical plane through the center line of the machine.

Referring next to FIG. 3 which is a side sectional view through one of the stations of the machines of the preceding figures, it will be noted that the apparatus comprises an upright frame means 10 that includes side walls that form a refrigerated storage compartment 115. The storage compartment serves to hold an active mix container indicated generally at 116 as well as a standby mix container 116-A.

Figure 4:
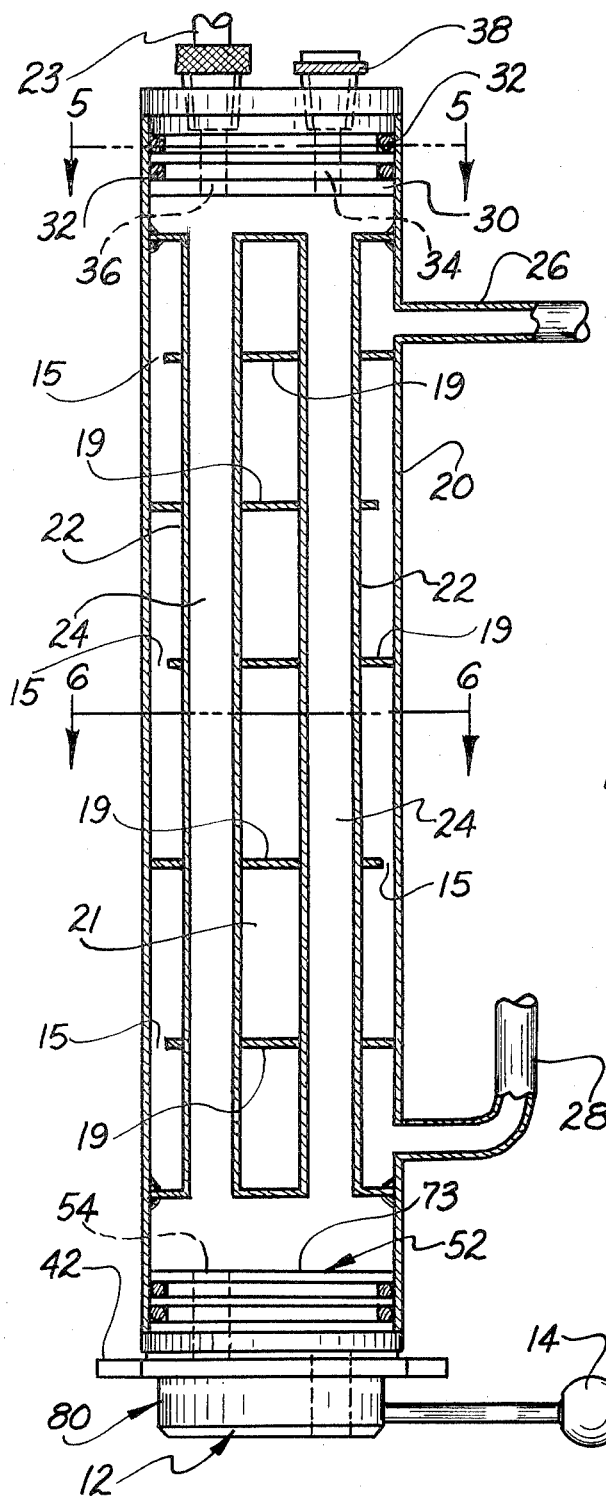
FIG. 4 is a side sectional view of a heat exchanger means comprising a portion of the machine of the preceding figures, the section being taken along the line 4—4 of FIG. 5.
Figure 5:
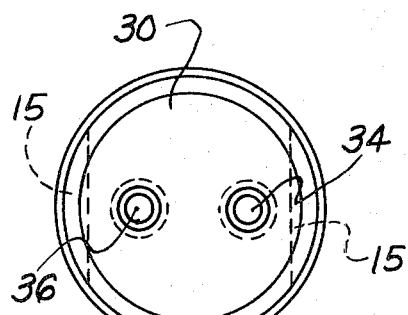
FIG. 5 is a top sectional view of the apparatus of FIG. 4, the section being taken along the line 5—5 of FIG. 4.

With contained reference to FIG. 3 active mix container 116 releases liquid mix via a mix delivery conduit 23 which is connected to the inlet passage 36, FIG. 4, of a heat exchanger or freezing chamber indicated at 20.

The mix container is pressurized by a suitable gas such as freon 115, nitrous oxide, or compressed air via line 136 which communicates with a pressurized source of gas, not illustrated.

With continued reference to FIG. 3, storage compartment 115 includes wall insulation indicated at 110 and is cooled by a cabinet refrigeration system including refrigerant coils 108, storage compressor 102, and a storage condensor 96. Such refrigeration system for the storage compartment is of a conventional type and is provided with the usual refrigeration controls for maintaining a constant preset temperature in the storage compartment.

Referring again to the novel cooling chamber indicated at 20 in FIG. 3, surrounded by a protective jacket 16 with the space between the chamber and jacket filled with suitable insulation consisting of fiberglass or the like.

As shown in FIG. 4, the heat exchanger comprises a plurality of longitudinally extending tubes 22 serving to convey the mix from inlet passage 36 in intimate heat relationship with a flow of refrigerant also, a clean-out passage 34 and plug 38 are provided to permit flushing and sterilization.

Refrigerant for the mix deliverant tubes 22 is supplied by a compressor 100, FIG. 3, via line 104 to exchange passage 21, coolant being returned by the 106. It should be mentioned that a condensor 98 is included in the refrigeration system for the heat exchanger means.

Here again the refrigeration system 100 for the coolant is provided with refrigeration controls of a conventional type for maintaining a preselected constant temperature for the coolant chamber 21 of the heat exchanger means.

It should be mentioned that the mix delivery tubes 22 consist of a plurality of passages 24 of relatively small diameter whereby the flowing refrigerant in chamber 21 intimately contacts a relatively large outer tube surface area, and further so that the heat transfer path from the center of the column of flowing mix in tubes 22 to and through the tube walls will be relatively short thereby providing highly efficient refrigeration of flowing mix without the need of mechanical mixing apparatus.

Figure 6:
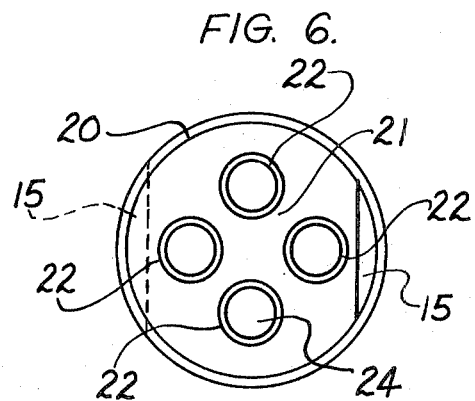
FIG. 6 is a top sectional view of the apparatus of FIG. 4, the section being taken along the line 6—6 of FIG. 4.

Referring particularly to FIG. 6-A the heat exchanger of FIG. 4 further includes a plurality of longitudinally spaced baffles 19, each of which is provided with an edge 13 that is spaced from the inner wall of the heat exchanger to form the staggered passages 15. Such baffles 19 are mounted on the four tubes 22 with such tubes being extended through respective holes 17 best seen in FIG. 6-A. Such baffles serve to divert the flow of refrigerant laterally so as to increase the length of the flow path and therefore the magnitude and efficiency of heat transfer between the flowing refrigerant and the mix. Such baffles further function to eliminate hot spots along the length of the heat exchanger.

Reference is next made to FIGS. 4 through 7 which illustrate the novel mix dispensing valve of the present invention. Such valve comprises an upper body portion 52 which is inserted into the lower end of heat exchanger means 20 such that the upper surface of upper body portion 52 is in direct heat exchange relationship with the frozen mix over a relatively large area.

With this arrangement upper body portion 52 is sufficiently refrigerated over a large heat transfer area such that valve 12 is efficiently refrigerated.

Figure 7:
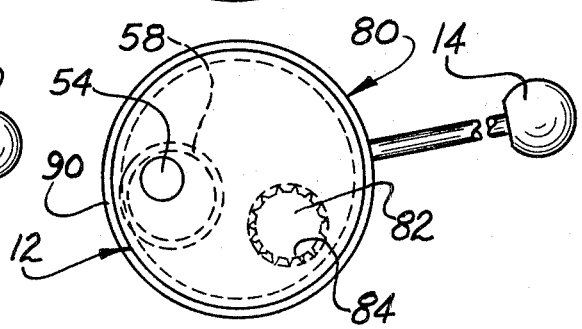
FIG. 7 is a bottom elevational view of the dispensing valve comprising a portion of the apparatus of FIG. 4.

With continued reference to FIGS. 4 and 7 dispensing valve 12 further includes a lower body portion indicated generally at 80 which is journaled in a mounting bracket 42 such that the lower body portion can be rotated with respect to the upper stationary body portion 52 by accurate manipulation of a handle 14.

The frozen mix is released by the valve body portions when handle 14 is actuated to bring lower body outlet passage 82 into alignment with upper body outlet passage 54 in upper valve body 52. This valve structure is illustrated and described in detail in my co-pending U.S. Pat. application Docket No. 6,786, U.S. Pat. Ser. No. 356,400 filed May 2, 1973. An O-ring 58 is mounted in a groove 56 in the lower surface of upper body portion 52 with such O-ring 58 being at all times in sealed relationship with the upper surface of lower body portion 12.

With reference to FIG. 7 lower outlet passage 82 is preferably provided with serations 84 at the outlet end thereof which functions to form the flow of frozen mix with a serated outer surface.

While the form of embodiment of the present invention as herein disclosed constitutes a preferred form, it is to be understood that other forms might be adopted.

What is claimed is:

1. A machine for dispensing soft ice cream or the like comprising, in combination, frame means; storage means for a mix to be dispensed from said machine; heat exchanger means for chilling said mix as it is dispensed from said storage means, said heat exchanger means including an outer housing forming a longitudinal passage for a colder fluid; refrigeration means for supplying a flow of said colder fluid to said longitudinal passage of said heat exchanger means; a plurality of mix conveying tubes extending through said longitudinal passage of said heat exchanger means and including outer tube surfaces in heat exchange relationship with said colder fluid and inner tube surfaces in heat exchange relationship with said mix, said heat exchanger further including a cold end chamber for continuously receiving chilled mix from said mix conveying tubes; and a metering valve for sequentially dispensing portions of said mix to said consumer, said metering valve including a generally disk-shaped upper valve body portion having an upper heat transfer surface in direct contact with the chilled mix in said cold end chamber, an upper valve body outlet passage, and a lower surface, a generally disk-shaped lower valve body portion including an upper surface in confronting heat transfer relationship with said lower surface of said upper body portion, and a lower outlet passage alignable with said upper valve body outlet passage.

2. The machine defined in claim 1 wherein said metering valve includes a pressure responsive seal between said confronting surfaces and in surrounding relationship with said outlet passages for preventing the escape of mix between said surfaces upon relative motion therebetween.

3. The machine of claim 2 wherein said lower outlet passage includes a depression in one of said surfaces for the free egress of mix to said lower outlet passage upon relative movement between said surfaces.

4. The machine of claim 2 wherein said pressure responsive seal includes a pressure relief means for reducing any excessive pressure imposed on said seal by said mix.

5. The machine of claim 2 wherein certain of said confronting surfaces includes a sloping surface at the periphery of certain of said confronting passages.

6. The machine of claim 1 that includes a plurality of longitudinally spaced baffle members disposed in said longitudinal passage of said heat exchanger means.

7. A machine for dispensing soft ice cream or the like comprising, in combination, frame means; storage means for a mix to be dispensed from said machine; heat exchanger means for chilling said mix as it is dispensed from said storage means, said heat exchanger means including an outer housing forming a longitudinal passage for a colder fluid; refrigeration means for supplying a flow of said colder fluid to said longitudinal passage of said heat exchanger means; a plurality of mix conveying tubes extending through said longitudinal passage of said heat exchanger means and including outer tube surfaces in heat exchange relationship with said colder fluid and inner tube surfaces in heat exchange relationship with said mix, said heat exchanger further including a cold end chamber for continuously receiving chilled mix from said mix conveying tubes, said end chamber including a cylindrical open end; and a metering valve for sequentially dispensing portions of said mix to said consumer, said metering valve including generally disk-shaped upper valve body portion insertably mounted in said cylindrical lower end of said heat exchanger in heat exchange relationship therewith and having an upper heat transfer surface in direct contact with the chilled mix in said cold end chamber, an upper valve body outlet passage, and a lower surface, a generally disk-shaped lower valve body portion including an upper surface in confronting heat transfer relationship with said lower surface of said upper body portion, and a lower outlet passage alignable with said upper valve body outlet passage.

* * * * *